United States Patent
Morikaku et al.

(10) Patent No.: US 7,021,973 B2
(45) Date of Patent: Apr. 4, 2006

(54) ELECTRIC ROTATING MACHINE

(75) Inventors: Hideki Morikaku, Tokyo (JP);
Yoshihito Asao, Tokyo (JP); Masaru Kuribayashi, Tokyo (JP)

(73) Assignee: Mitsubishi Denki Kagushisa Kaisha, Tokyo (JP)

( * ) Notice: Subject to any disclaimer, the term of this patent is extended or adjusted under 35 U.S.C. 154(b) by 0 days.

(21) Appl. No.: 10/694,894

(22) Filed: Oct. 29, 2003

(65) Prior Publication Data
US 2004/0092134 A1    May 13, 2004

(30) Foreign Application Priority Data
Oct. 29, 2002 (JP) ............................. 2002-314107

(51) Int. Cl.
*H01R 9/22* (2006.01)

(52) U.S. Cl. ...................... 439/709; 310/71; 310/68 D

(58) Field of Classification Search ................. 310/71, 310/68 D; 439/709
See application file for complete search history.

(56) References Cited

U.S. PATENT DOCUMENTS

| | | | | |
|---|---|---|---|---|
| 3,518,616 A | * | 6/1970 | Lewis | 439/470 |
| 3,586,892 A | | 6/1971 | Sato | |
| 4,590,397 A | * | 5/1986 | Davis | 310/71 |
| 4,683,390 A | * | 7/1987 | Imori et al. | 310/71 |
| 4,843,267 A | | 6/1989 | Kaneyuki | |
| 5,795,195 A | * | 8/1998 | Karlsberger | 439/783 |
| 5,828,147 A | * | 10/1998 | Best et al. | 310/71 |
| 5,852,338 A | * | 12/1998 | Boyd et al. | 310/89 |
| 5,854,522 A | * | 12/1998 | Iwata et al. | 310/89 |
| 5,856,717 A | * | 1/1999 | Stimson | 310/71 |
| 5,872,410 A | * | 2/1999 | Sudoff | 310/68 R |
| 5,889,345 A | * | 3/1999 | Iwata et al. | 310/88 |
| 5,901,801 A | * | 5/1999 | Toida et al. | 180/65.1 |
| 5,912,517 A | | 6/1999 | Nishimura et al. | |
| 5,912,518 A | * | 6/1999 | Misik | 310/71 |
| 5,949,167 A | * | 9/1999 | Blalock et al. | 310/71 |
| 5,977,669 A | * | 11/1999 | Yoshida et al. | 310/68 D |
| 6,011,341 A | * | 1/2000 | Toya et al. | 310/239 |
| 6,028,386 A | * | 2/2000 | Kech et al. | 310/194 |
| 6,030,260 A | * | 2/2000 | Kikuchi et al. | 439/890 |
| 6,034,452 A | * | 3/2000 | Nakamura et al. | 310/68 D |
| 6,060,802 A | * | 5/2000 | Masegi et al. | 310/68 D |
| 6,081,054 A | | 6/2000 | Kashihara et al. | |
| 6,107,710 A | * | 8/2000 | Gamboa | 310/67 R |

(Continued)

FOREIGN PATENT DOCUMENTS

DE    200 22 774 U1    4/2002

(Continued)

*Primary Examiner*—Ross Gushi
(74) *Attorney, Agent, or Firm*—Sughrue Mion, PLLC

(57) ABSTRACT

An output terminal board of this invention is capable of improving easy and simple installation of an electric rotating machine and wiring output harnesses so as to avoid thermal influence from a stator. The electric rotating machine 2 for vehicle acting as a moter or a generator includes brackets 7 and 15 on both front side (pulley side) and rear side of a stator. Further, the electric rotating machine 2 includes a stator three-phase output line output portion and is provided with an output terminal board 8 at one bracket 7, the output terminal board 8 having a terminal for connecting the three-phase output harnesses 6 connected to an external controller. This output terminal board 8 is disposed in such a manner as being capable of joining to the bracket 7 side on which the output terminal board 8 is mounted, and the three output harnesses 6 are taken out substantially in parallel to one another.

20 Claims, 20 Drawing Sheets

U.S. PATENT DOCUMENTS

| | | | |
|---|---|---|---|
| 6,150,741 A * | 11/2000 | Hayashi et al. | 310/68 D |
| 6,160,335 A * | 12/2000 | Ishida et al. | 310/68 D |
| 6,184,602 B1 * | 2/2001 | Ooiwa et al. | 310/68 D |
| 6,198,188 B1 * | 3/2001 | Ihata | 310/68 D |
| 6,223,416 B1 * | 5/2001 | Boyd et al. | 29/596 |
| 6,252,320 B1 * | 6/2001 | Ballard et al. | 310/68 D |
| 6,275,404 B1 * | 8/2001 | Shichijyo et al. | 363/145 |
| 6,285,100 B1 * | 9/2001 | Pflueger et al. | 310/68 D |
| 6,294,856 B1 * | 9/2001 | Ishida et al. | 310/232 |
| 6,300,698 B1 * | 10/2001 | Fargo et al. | 310/71 |
| 6,426,575 B1 * | 7/2002 | Masegi et al. | 310/68 D |
| 6,455,962 B1 * | 9/2002 | Suzuki et al. | 310/71 |
| 6,470,984 B1 * | 10/2002 | Nakajima et al. | 180/65.2 |
| 6,476,527 B1 * | 11/2002 | Ballard et al. | 310/68 D |
| 6,492,752 B1 * | 12/2002 | Ishida | 310/71 |
| 6,528,912 B1 * | 3/2003 | Asao | 310/68 D |
| 6,548,924 B1 * | 4/2003 | Furukawa et al. | 310/68 C |
| 6,586,858 B1 * | 7/2003 | Finkle | 310/233 |
| 6,608,422 B1 * | 8/2003 | Bartman | 310/219 |
| 6,617,735 B1 * | 9/2003 | Tan et al. | 310/91 |
| 6,655,989 B1 * | 12/2003 | Gale et al. | 439/559 |
| 6,657,336 B1 * | 12/2003 | Morikaku et al. | 310/68 D |
| 6,664,674 B1 * | 12/2003 | Ihata | 310/64 |
| 6,664,675 B1 * | 12/2003 | Kaizu | 310/68 D |
| 6,664,678 B1 * | 12/2003 | Shimizu | 310/71 |
| 6,664,682 B1 * | 12/2003 | Williams et al. | 310/89 |
| 6,674,193 B1 * | 1/2004 | Asao | 310/68 D |
| 6,674,194 B1 * | 1/2004 | Asao | 310/68 D |
| 6,700,243 B1 * | 3/2004 | Asao | 310/68 D |
| 6,702,612 B1 * | 3/2004 | Miyazaki et al. | 439/559 |
| 6,724,108 B1 * | 4/2004 | Nakano | 310/68 D |
| 6,737,772 B1 * | 5/2004 | Tanaka et al. | 310/71 |
| 6,740,995 B1 * | 5/2004 | Oohashi et al. | 310/68 D |
| 6,744,160 B1 * | 6/2004 | Piovesan | 310/68 C |
| 6,750,577 B1 * | 6/2004 | Mimura | 310/71 |
| 6,774,525 B1 * | 8/2004 | Tanaka et al. | 310/233 |
| 6,800,982 B1 * | 10/2004 | Ebihara | 310/239 |
| 6,847,150 B1 * | 1/2005 | Kometani et al. | 310/263 |
| 6,888,277 B1 * | 5/2005 | Watzek et al. | 310/90 |
| 6,897,584 B1 * | 5/2005 | Doherty et al. | 310/71 |
| 6,900,566 B1 * | 5/2005 | Misaki | 310/89 |
| 2002/0043883 A1 * | 4/2002 | Shimizu | 310/71 |

FOREIGN PATENT DOCUMENTS

| | | |
|---|---|---|
| GB | 2 340 673 A | 2/2000 |
| JP | 57-65557 | 10/1980 |
| JP | 61-2758 | 1/1986 |
| JP | 2505086 | 5/1996 |
| JP | 2585896 | 12/1996 |
| JP | 9232127 | 9/1997 |
| JP | 10112958 | 4/1998 |
| JP | 11089167 | 3/1999 |
| JP | 2000-83358 | 3/2000 |

* cited by examiner

ELECTRIC ROTATING MACHINE

BACKGROUND OF THE INVENTION

1. Field of the Invention

This invention relates to an electric rotating machine for vehicle and, more particularly, to an output terminal structure for connection of three-phase output harness and a stationary structure of the terminal structure.

2. Description of the Related Art

In the conventional output terminal board structure of an electric rotating machines for vehicle, an output terminal extends in axial direction of the electric rotating machine, or is formed in radial direction of the electric rotating machine (as disclosed in, for example, the Japanese Patent Publication No.2585896, the Japanese Utility Model Registration Publication No.2505086).

Since the conventional output terminal structure of the electric rotating machines for vehicle is constructed as mentioned above, it may be said that the output terminal extends efficiently from axial direction of the electric rotating machine to radial direction thereof. In this conventional structure, however, it is impossible to regulate wiring direction or to minimize wiring space in the output harness to be connected.

Further, the harness is taken out without consideration of extending direction. Accordingly, when a harness by-passed in view of wiring layout is located on the stator side where temperature is high, the harness suffers from influence of heat from the stator. As a result, a serious problem exists in that coating applied on the lead wire is molten or grounded and so on.

Furthermore, under the background of increasing demand of higher output of the electric rotating machine, it is a recent trend that cable diameter of the output harness is obliged to be larger and weight of the harness is heavy. Accordingly, it becomes essential to secure strength of the output terminal board. Thus, in the conventional structure, any load due to vibration of the output harness is received at the output terminal of the electric rotating machine, which is a further problem from the viewpoint of strength.

Moreover, in the electric rotating machine of which output line is formed into three phases, weight of the output harness becomes also three times and, therefore, a tougher output terminal board has been desired.

Generally, the output line of the electric rotating machine contains any noise component because of operation of the electric rotating machine. A still further problem exists in that the noise component generates radio noises, thereby causing any malfunction of electronic equipment used in the vehicle.

To reduce the noise, it may be an idea that any shield line is applied to the output harness. However, a yet further problem exists in that any additional terminal should be separately provided to ground the shield line.

SUMMARY OF THE INVENTION

This invention has been made to solve the above-discussed problems and has an object of providing an output terminal structure of an electric rotating machine capable of improving easy and simple installation of the electric rotating machine and wiring an output harness so as to avoid thermal influence from a stator.

An electric rotating machine of the invention includes an output terminal board mounted on one bracket, and an output harness connected to the output terminal board. In this electric rotating machine, the output harness is connected to the output terminal board in such a manner as to extend in a direction opposite to the other bracket.

In the electric rotating machine of above construction, it is possible to avoid thermal influence from the stator.

DESCRIPTION OF THE PREFERRED EMBODIMENTS

Embodiment 1.

An embodiment according to this invention is hereinafter described referring to the accompanying drawings.

Figure 1:
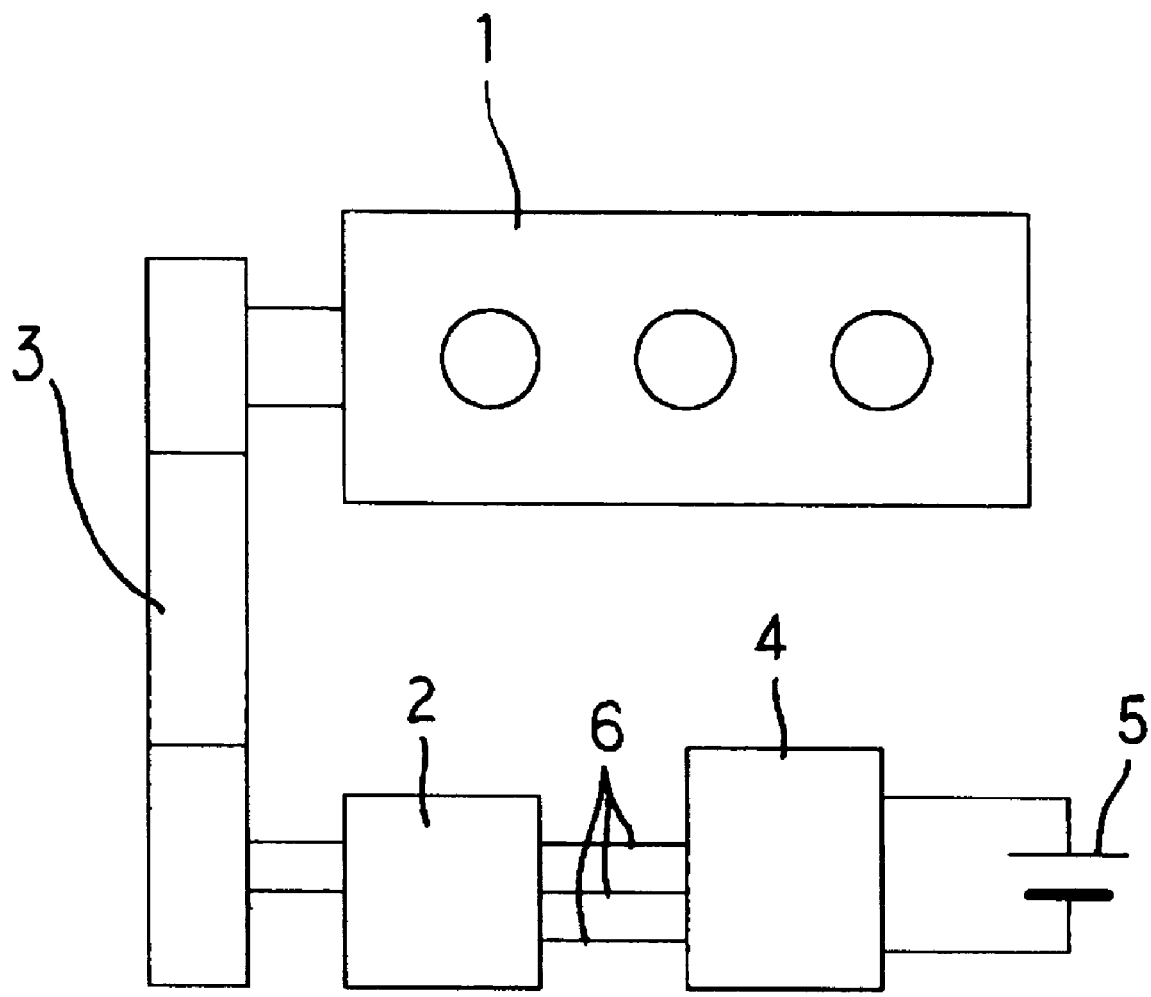
FIG. 1 is a system block diagram of a vehicle provided with an electric rotating machine according to Embodiment 1 of the invention.

FIG. 1 is a system block diagram of a vehicle provided with an engine that is connected with an electric rotating machine via a belt.

Although FIG. 1 shows an example of connecting the electric rotating machine with the engine via the belt, the engine and the electric rotating machine may be connected with each other by any other method on condition that the electric rotating machine acts as both generator and a motor.

Referring now to the drawing, the electric rotating machine 2 is connected with the engine 1 via the belt 3. The electric rotating machine 2 is electrically connected to a control unit 4 with the use of three output harnesses 6. The control unit 4 is electrically connected to a battery 5.

The control unit 4 controls the electric rotating machine 2 to act as either motor or generator.

At the time of starting the engine 1, the control unit 4 supplies power to the electric rotating machine 2 via the three-phase harnesses 6 and controls the electric rotating machine 2 to act as a motor.

On the other hand, after the engine 1 has started, the electric rotating machine 2 is operated as a generator. Then, after being converted to DC by the control unit 4 via the three-phase harnesses 6, power is supplied to vehicle loads (not shown) and the battery 5.

Figure 2:
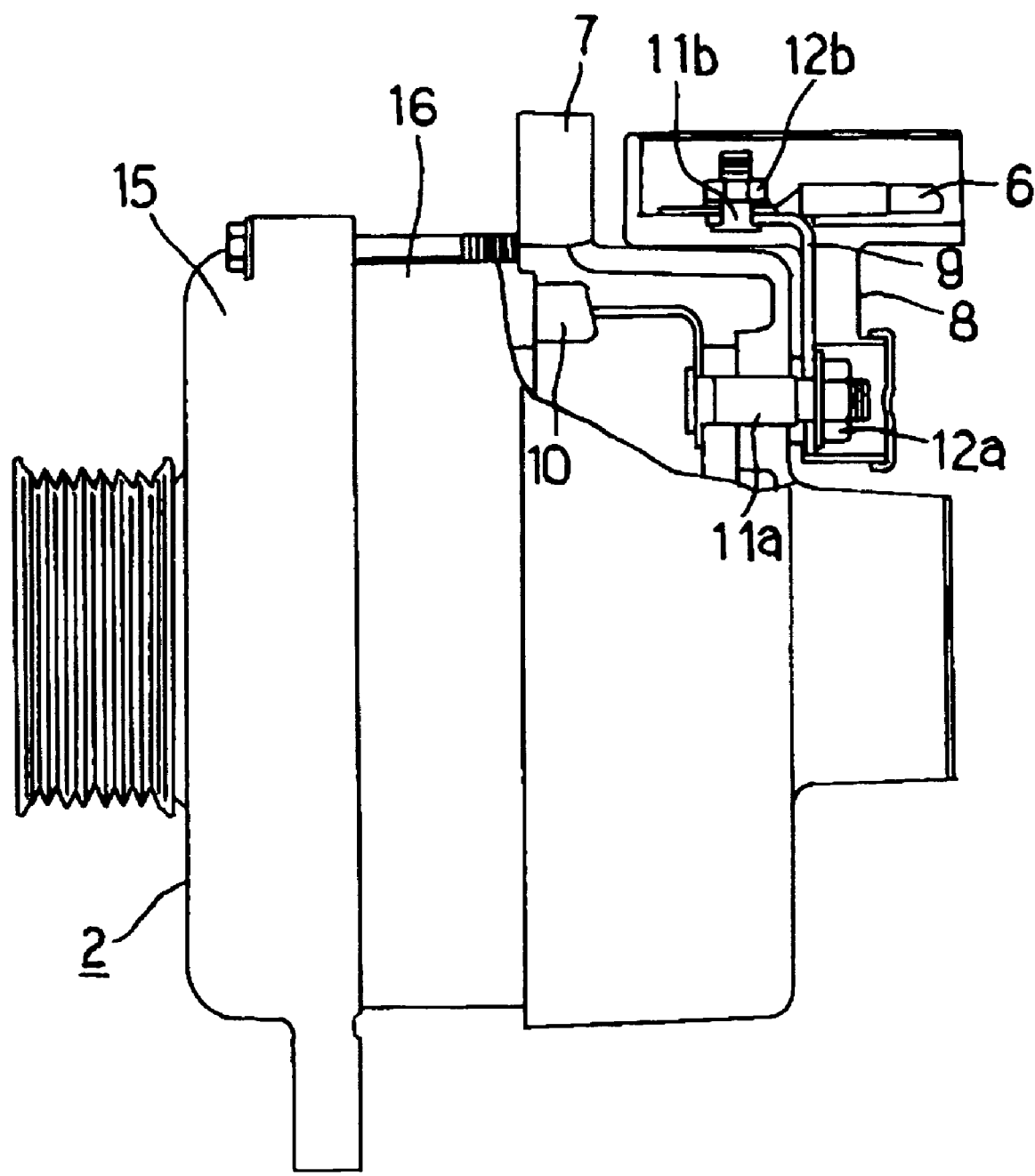
FIG. 2 is a partially cutout side view showing an electric rotating machine according to Embodiment 1 of the invention.
Figure 3:
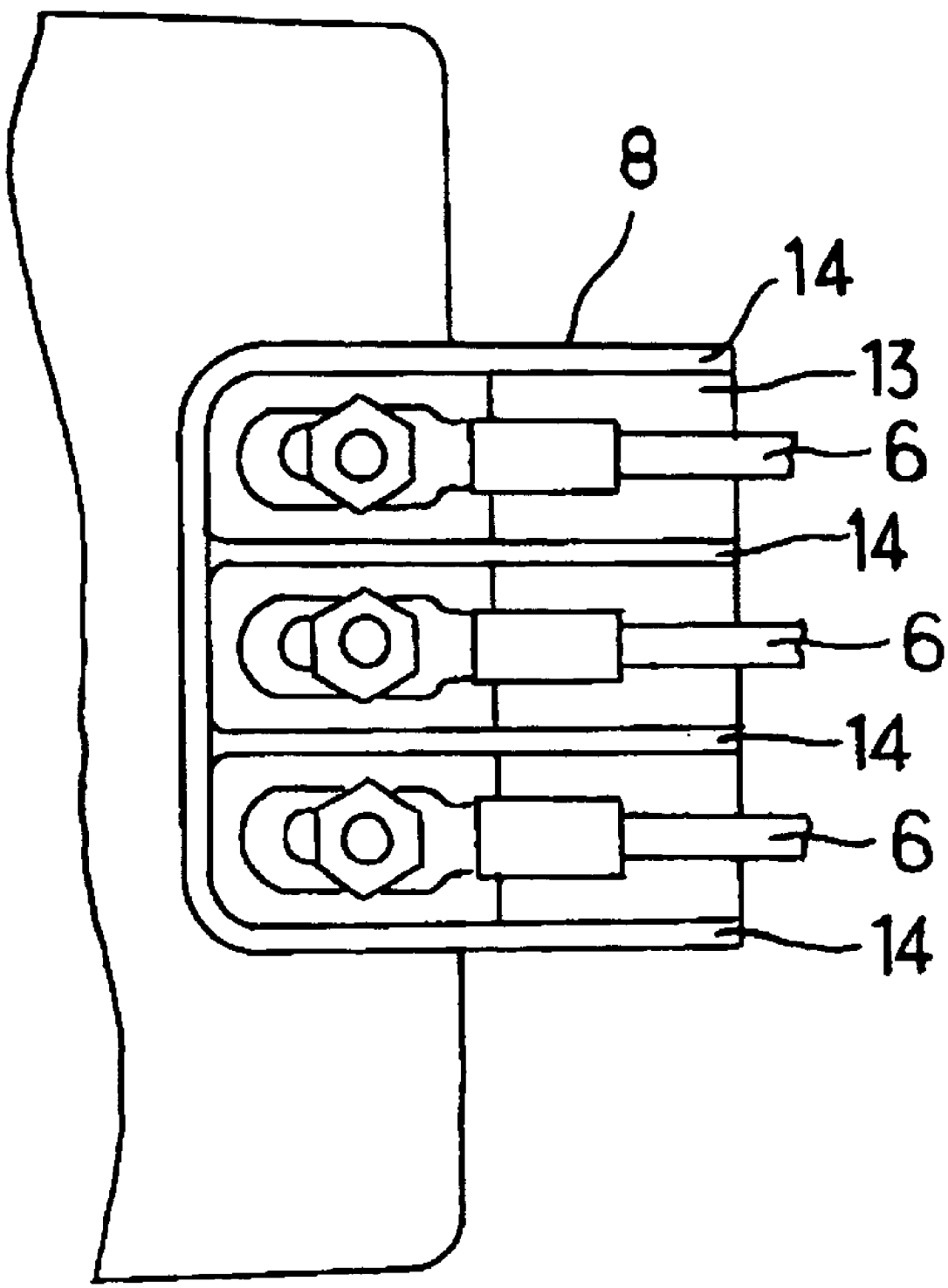
FIG. 3 is a plane view showing an output terminal part of the electric rotating machine according to Embodiment 1 of the invention.

FIG. 2 is a side view showing the electric rotating machine 2, and FIG. 3 is a plane view showing an output terminal part of the electric rotating machine 2.

In FIG. 2, the electric rotating machine 2 is provided with a rear bracket 7 serving as one bracket. An output terminal board 8 is connected with the rear bracket 7 and holds a terminal 9 inside thereof utilizing insert molding or the like. The terminal 9 is fixedly connected to a stator coil 10 of the electric rotating machine 2 by a bolt 11a and nut 12a.

The output terminal board 8 is provided with a bolt 11b for connecting the output harness 6. The output harness 6 and the connecting bolt 11b are firmly connected by a nut 12b.

Referring now to FIG. 3, the output terminal board 8 is provided with three slots 13 so that the three three-phase harnesses 6 may be accommodated therein. Partition walls 14 isolate the slots respectively for insulation from each other.

The partition walls 14 are disposed at an equal distance between one and another, and this distance is slightly larger than the external diameter of each output harness 6. This prevents each output harness 6 from turning together at the time of mounting the output harness 6.

The output terminal board 8 causes the output harnesses 6 to extend in a direction opposite to a front bracket 15 serving another bracket (i.e., in a direction away from a stator 16). Accordingly, the output harnesses 6 are prevented from thermal influence due to heat generated by the stator 16 of the electric rotating machine 2.

Figure 4:
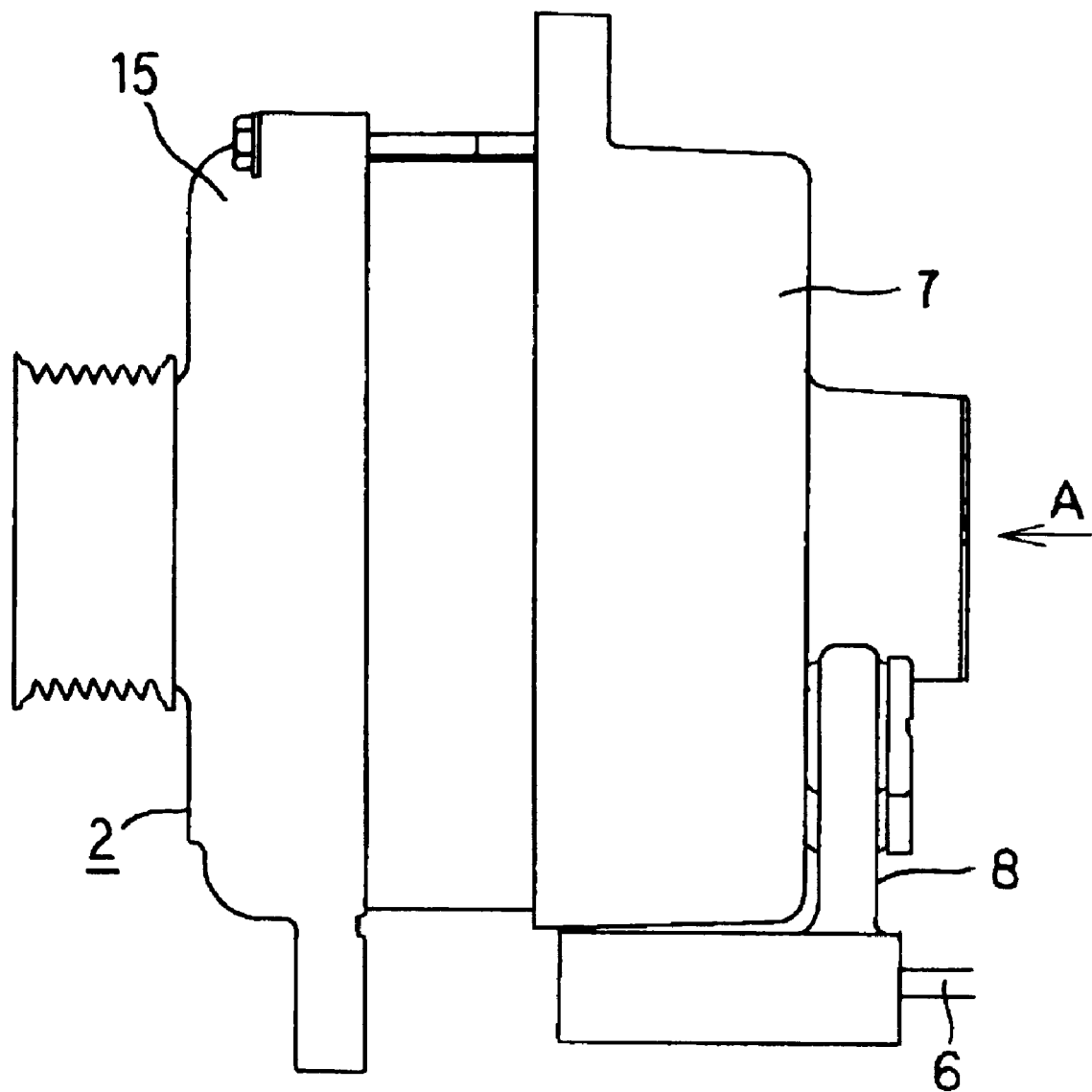
FIG. 4 is a side view showing the electric rotating machine according to Embodiment 1 of the invention.
Figure 5:
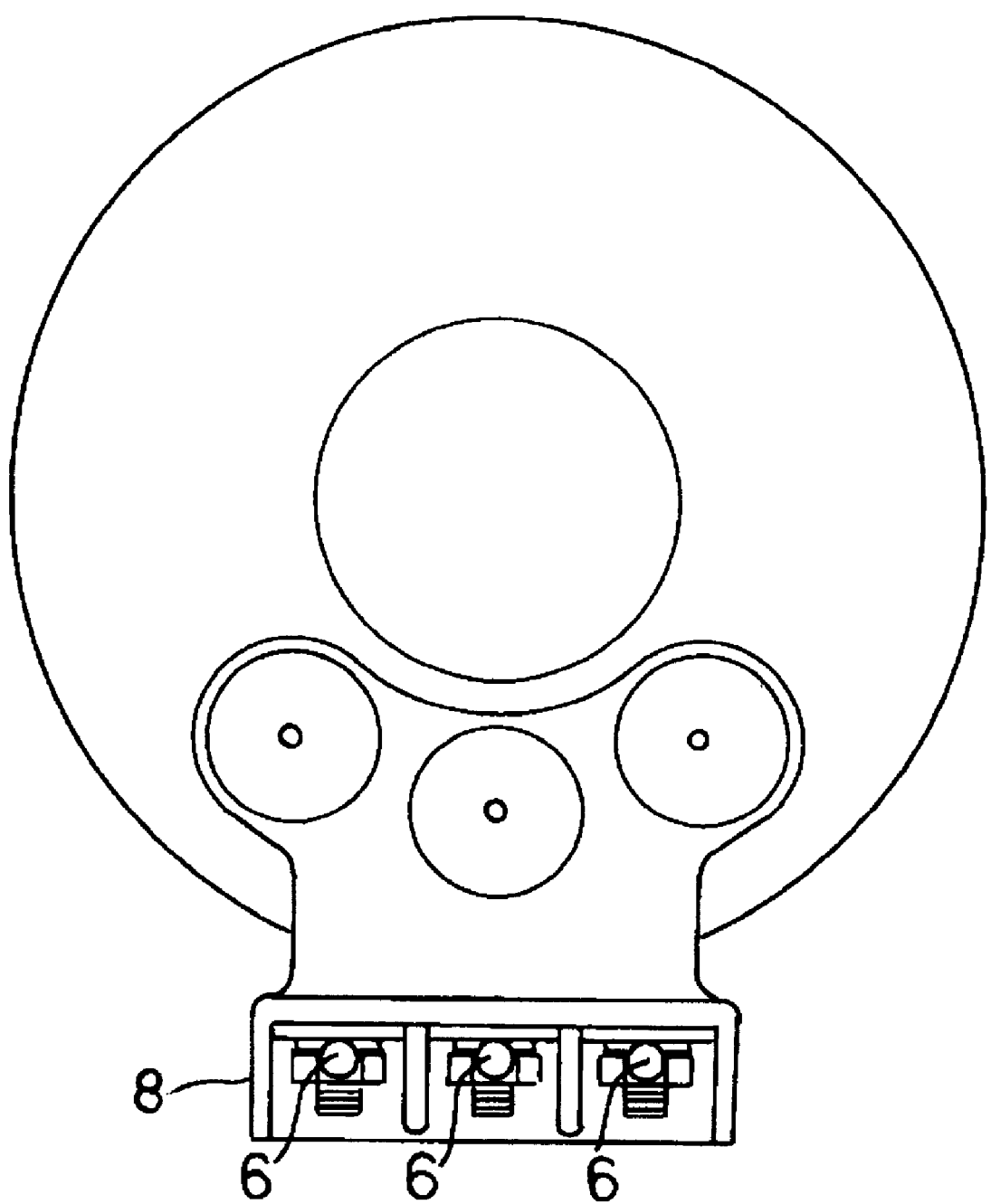
FIG. 5 is a rear view showing the electric rotating machine according to Embodiment 1 of the invention.

FIG. 4 is a side view showing another example of mounting the output terminal board 8 on the electric rotating machine 2. FIG. 5 is a rear view taken in the direction A of FIG. 4.

Referring to the drawings, the output terminal board 8 is disposed on the same plane as the outer peripheral face of the rear bracket 7 of the electric rotating machine 2. The output harnesses 6 are arranged in such a manner as to extend oppositely in axial direction of the front bracket 15 of the electric rotating machine 2.

The above-described arrangement is advantageous especially in the case that there is any obstacle in outer peripheral space of the electric rotating machine 2 or in axial direction of the front bracket 15 side and the output harnesses 6 are difficult to be disposed at the portion blocked by the obstacle.

In the prior art, since the three-phase output terminal is disposed directly on the bracket and the three-phase harnesses are connected thereto, the three-phase output harnesses are undesirably connected in radial direction of the bracket, resulting in occupying a larger space in the wiring layout. On the other hand, in this embodiment, since the three-phase output harnesses are connected in axial direction, a smaller space is sufficient.

Moreover, in the prior art, it is difficult to mount the harnesses because each harness turns at the time of mounting. On the other hand, the harnesses do not turn in this embodiment.

Furthermore, in the prior art, since the three-phase output harnesses are taken out in random directions, the stator of high temperature may thermally affect any harness by-passed in view of wiring layout. This results in such disadvantage as melting of coating of the lead, grounding thereof or the like. On the other hand, in this invention, since the three output harnesses 6 are taken out substantially in parallel to one another and in the direction away from the stator, it is possible to prevent such thermal influence.

Embodiment 2.

Figure 6:
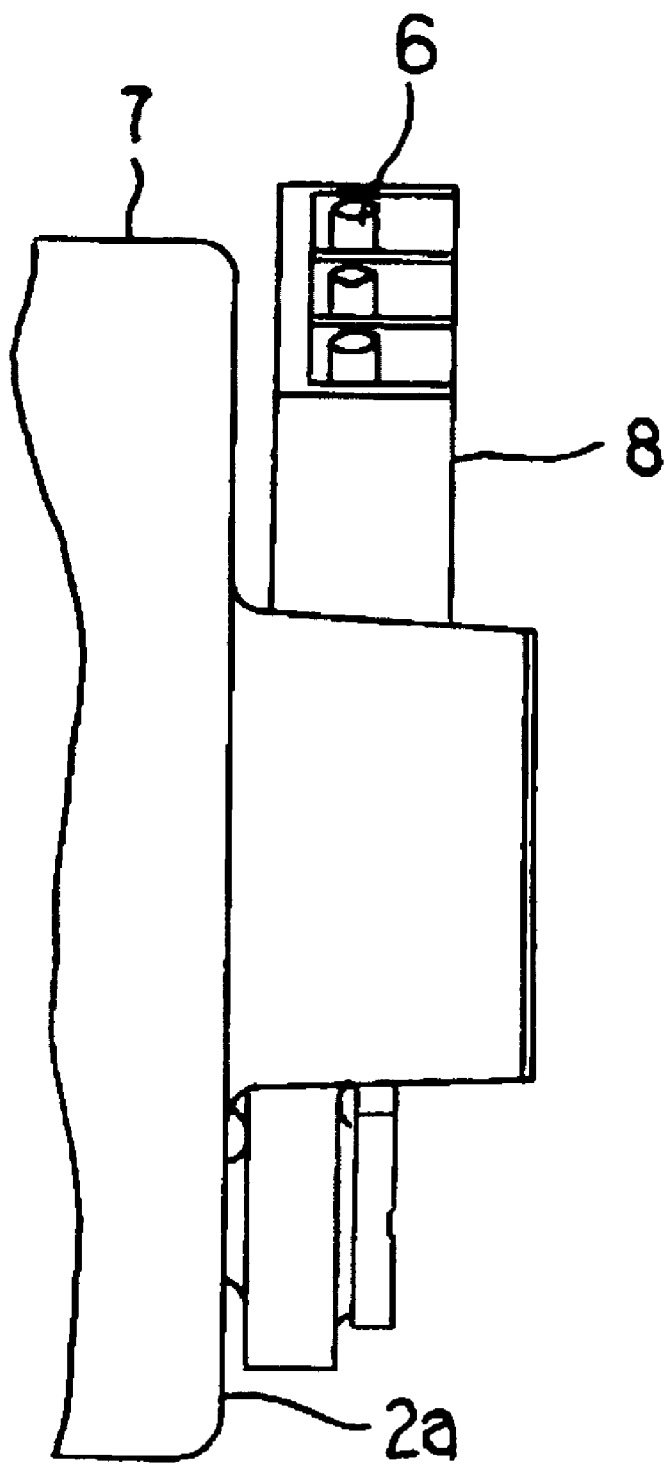
FIG. 6 is a partially side view showing an electric rotating machine according to Embodiment 2 of the invention.
Figure 7:
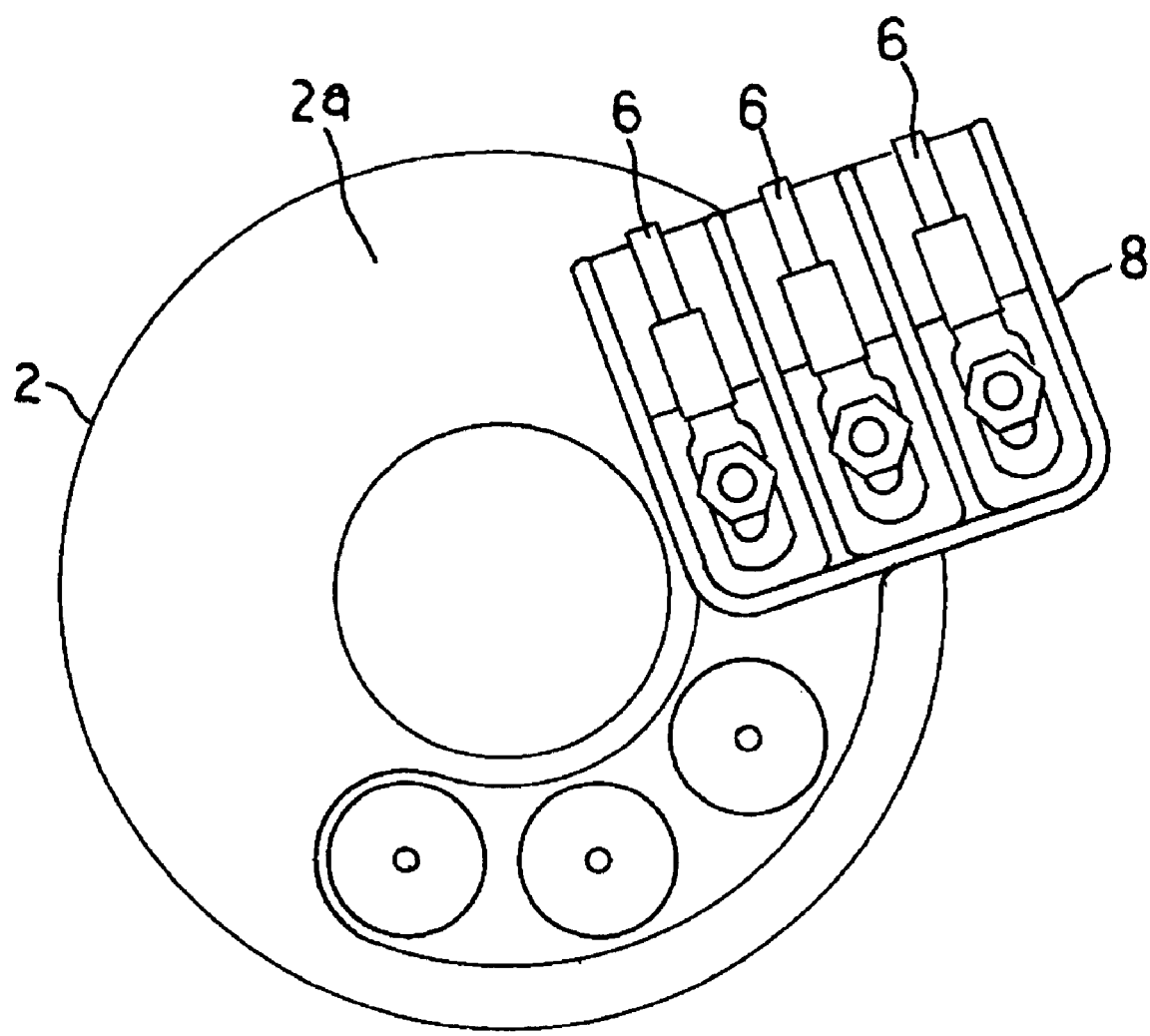
FIG. 7 is a rear view showing the electric rotating machine according to Embodiment 2 of the invention.

FIG. 6 is a partially side view showing an electric rotating machine according to Embodiment 2 of this invention, and FIG. 7 is a rear view taken in the direction A.

Referring to the drawings, the output terminal board 8 is disposed on a rear end face 2a of the rear bracket 7 of the electric rotating machine 2. The output harnesses 6 are arranged to extend in parallel to the rear end face 2a.

This embodiment is advantageous especially in the case that there is any obstacle in the rear of the electric rotating machine 2, i.e., behind the rear bracket 7 side and the output harnesses 6 are difficult to be disposed at the portion blocked by the obstacle.

Figure 8:
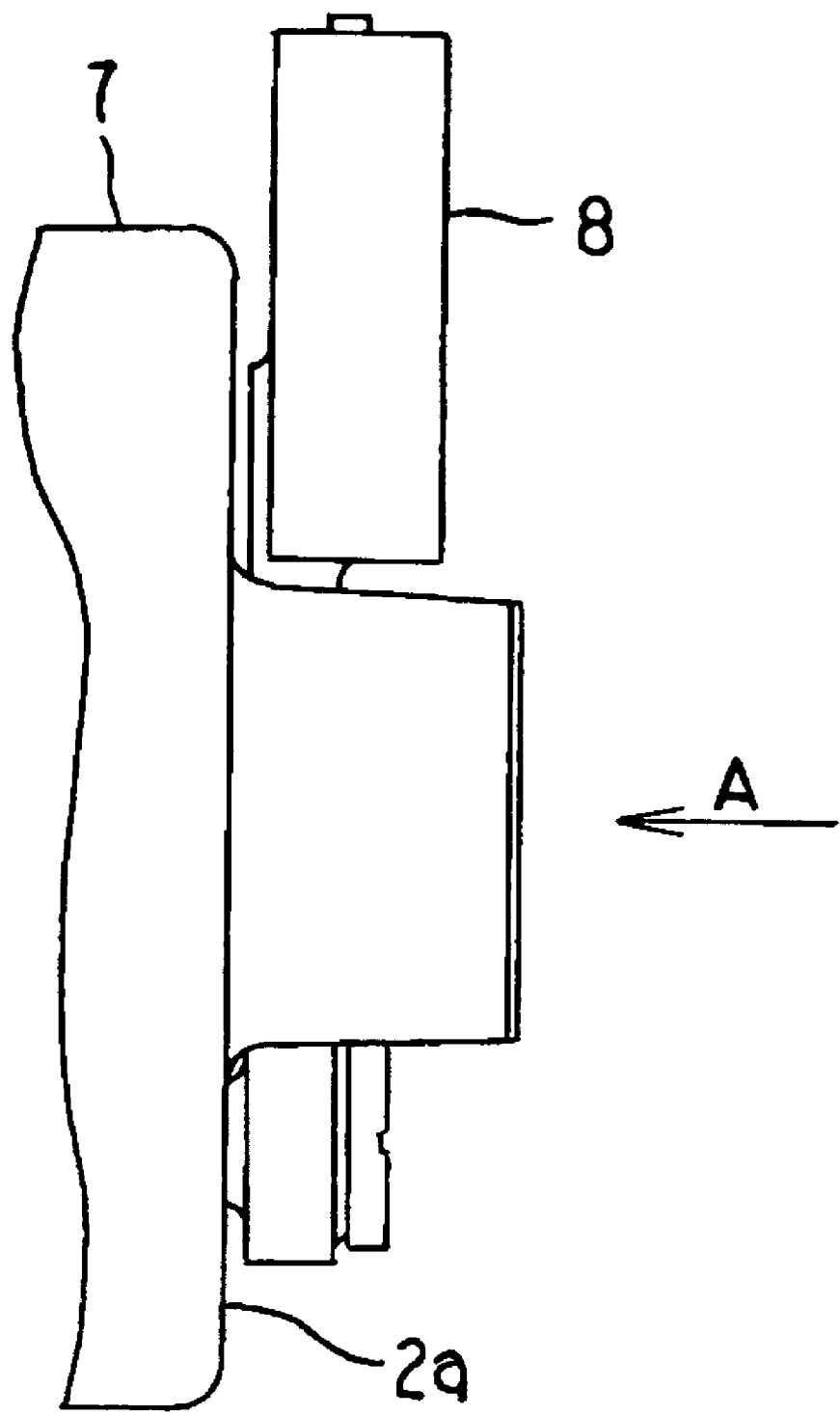
FIG. 8 is a partially side view showing the electric rotating machine according to Embodiment 2 of the invention.
Figure 9:
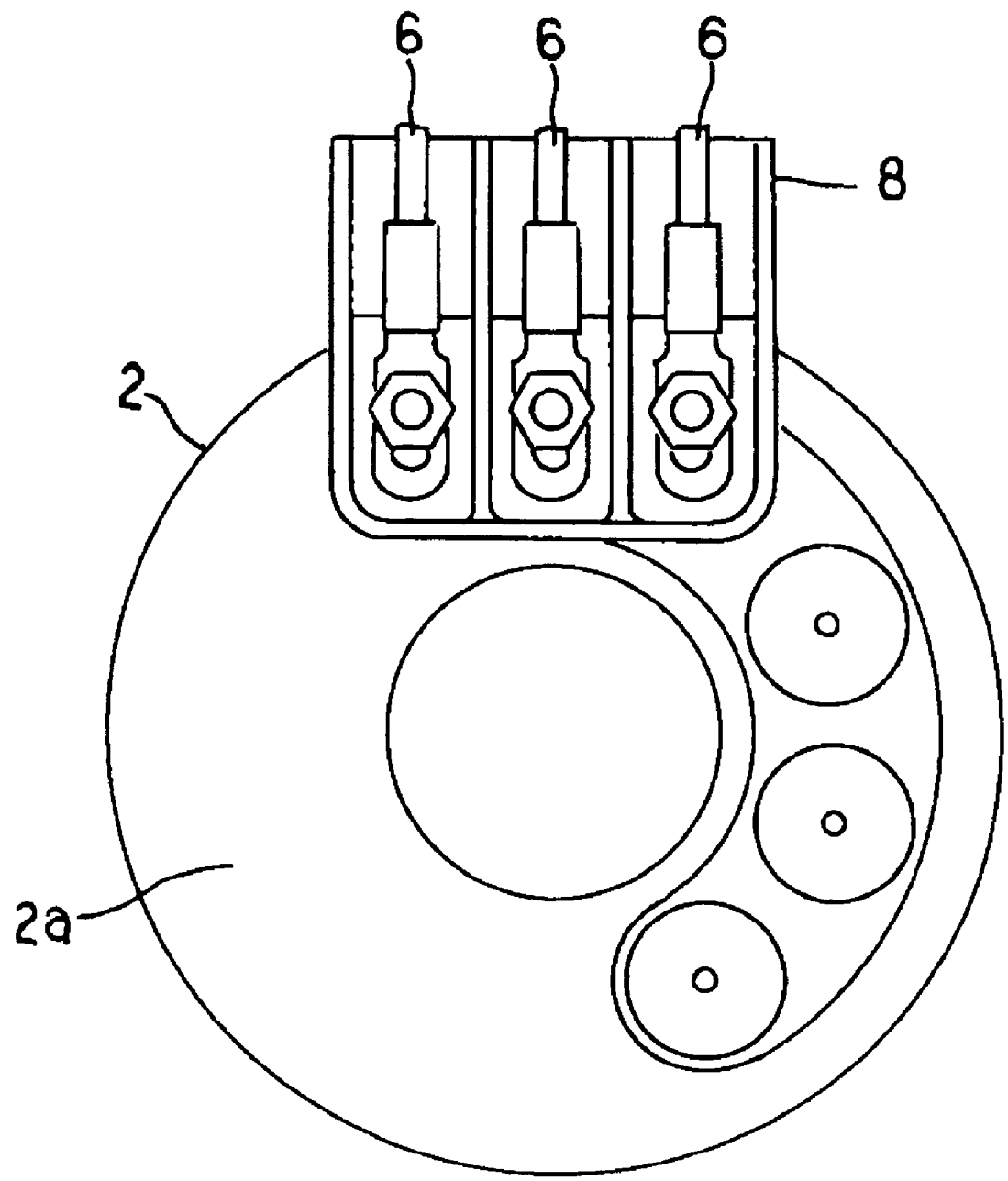
FIG. 9 is a rear view showing the electric rotating machine according to Embodiment 2 of the invention.

FIG. 8 is a partially side view showing an electric rotating machine according to another example and FIG. 9 is a rear view taken in the direction A of FIG. 8. In the same manner as in FIGS. 6 and 7, the output terminal board 8 is disposed on the rear end face 2a of the rear bracket 7 of the electric rotating machine 2, and the output harnesses 6 are arranged to extend in parallel to the rear end face 2a.

Additionally, this embodiment is not limited to the examples shown in FIGS. 6 to 9. That is, the output terminal board 8 may be disposed in any positional relation, as far as the output terminal board 8 is disposed on the rear end face 2a and the output harnesses 6 are arranged to extend in parallel to the rear end face 2a.

As described above, according to this embodiment, since the output harnesses 6 are taken out on the same plane as the end face of the bracket in the axial direction, the wiring layout space can be restrained on the end face alone. As a result, it is now possible to mount the electric rotating machine for vehicle easily and smoothly.

Additionally, since the three-phase output harnesses 6 are taken out in the direction away from the stator 16, it is now possible to wire so as to avoid thermal influence from the stator 16.

Embodiment 3.

Figure 10:
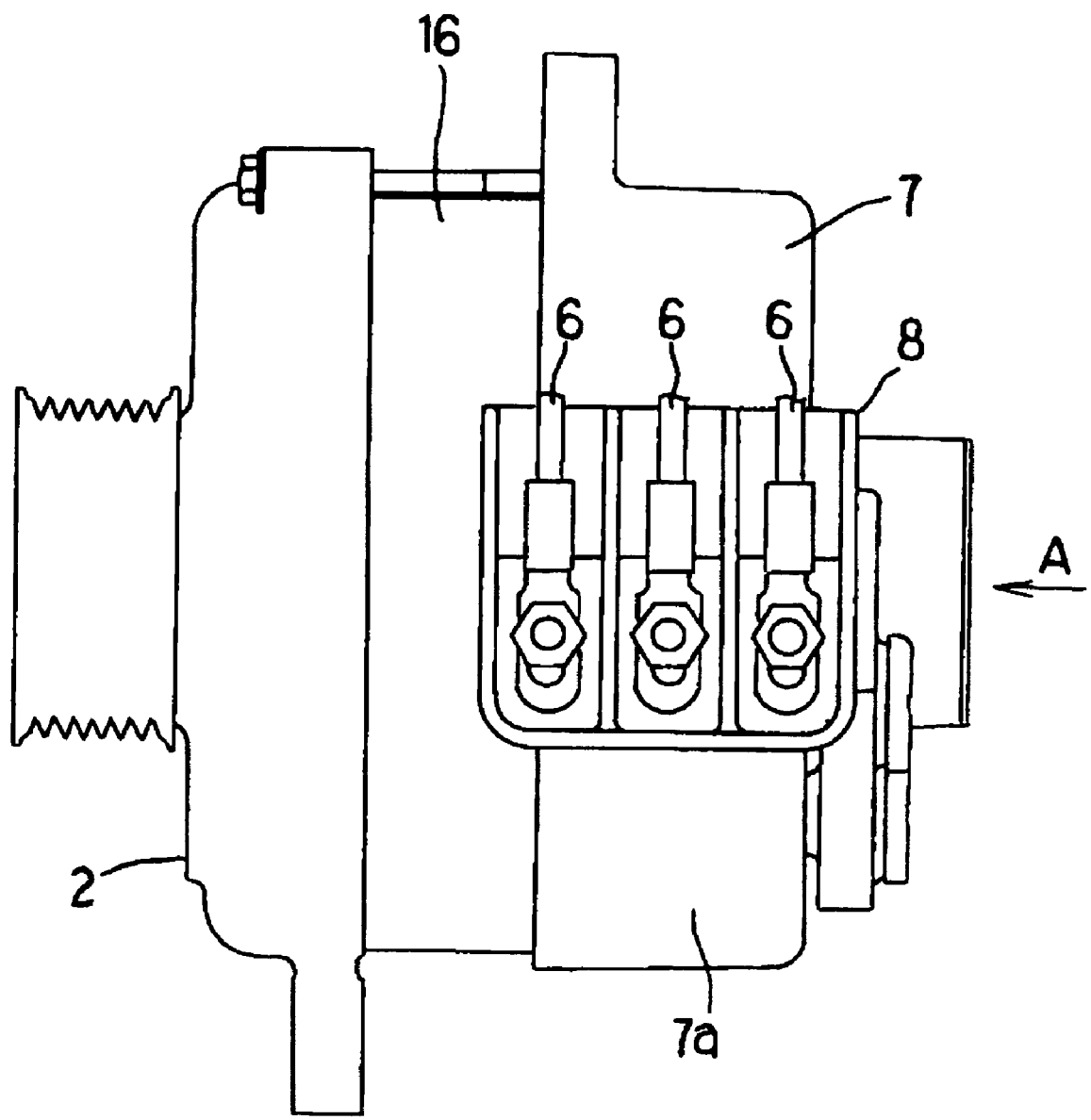
FIG. 10 is a side view showing an electric rotating machine according to Embodiment 3 of the invention.
Figure 11:
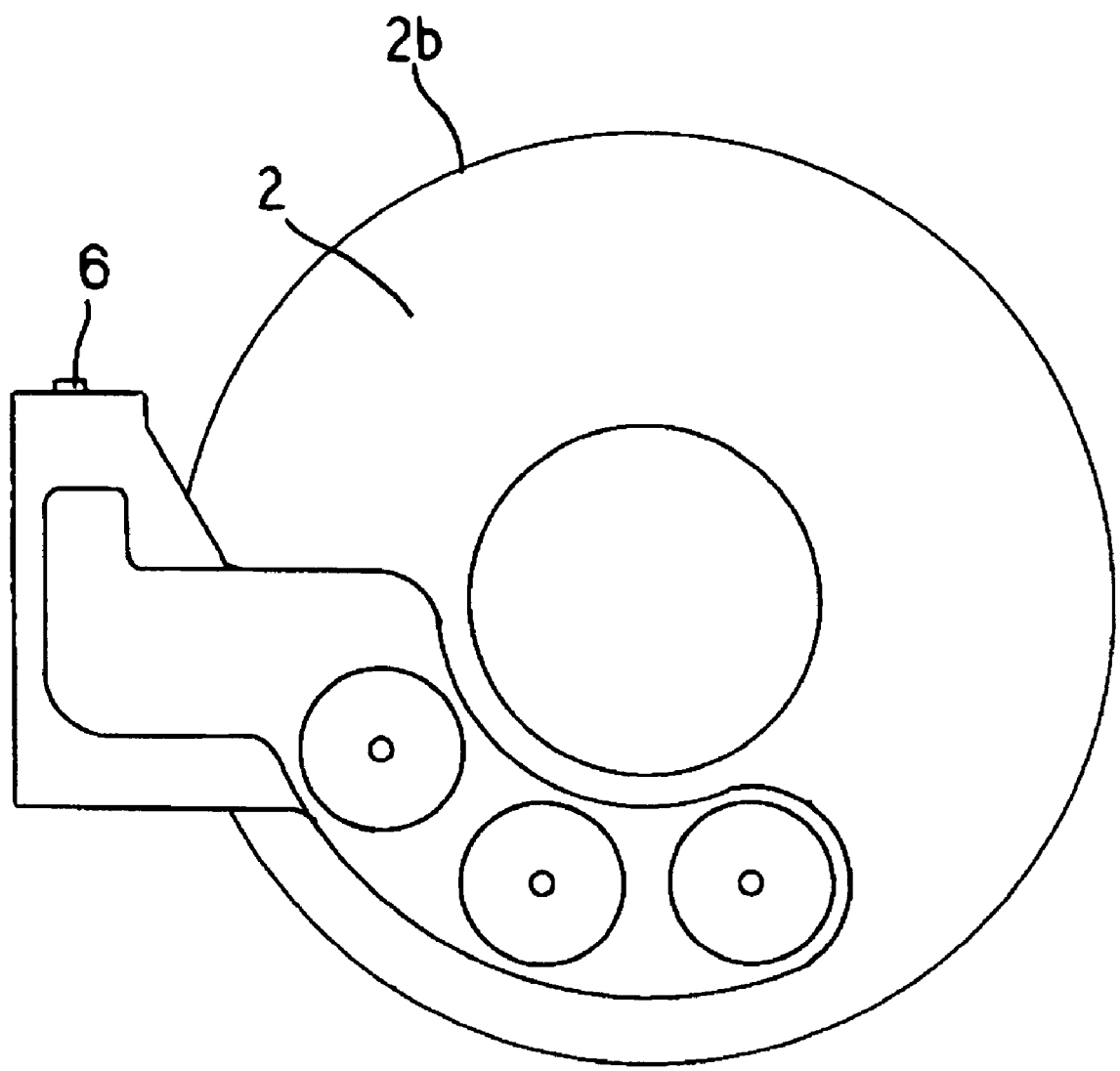
FIG. 11 is a rear view showing the electric rotating machine according to Embodiment 3 of the invention.

FIG. 10 is a side view showing an electric rotating machine according to the embodiment 3 of this invention, and FIG. 11 is a rear view taken in the direction A of FIG. 10.

Referring to the drawings, the output terminal board 8 is disposed on a side face 7a of the rear bracket 7 of the electric rotating machine 2. The three output harnesses 6 are disposed in a direction tangential to a circumferential line 2b forming the outer periphery of the electric rotating machine 2 and are arranged to extend substantially in parallel to one another.

This embodiment is advantageous especially in the case that there is any obstacle in the rear of the electric rotating machine 2, i.e., behind the rear bracket 7 side and the output harnesses 6 are difficult to be disposed at the portion blocked by the obstacle.

As described above, according to this embodiment, since the output harnesses 6 are taken out in the circumferential direction of the bracket 7, the wiring layout can occupy a limited space in the circumferential direction alone. Additionally, the output harnesses 6 can be disposed in such a direction as being capable of preventing the thermal influence from the stator 16.

Embodiment 4.

Figure 12:
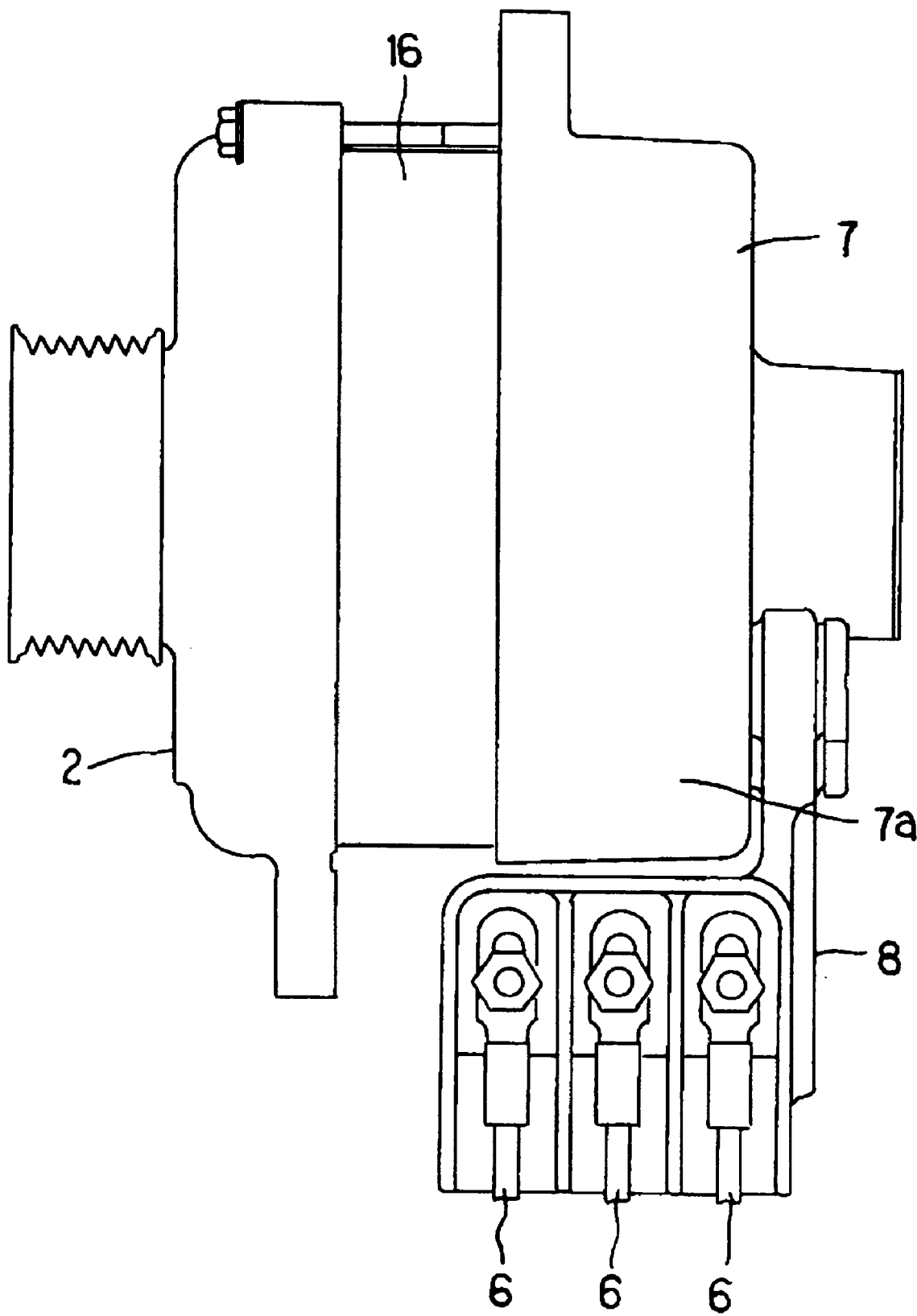
FIG. 12 is a side view showing an electric rotating machine according to Embodiment 4 of the invention.
Figure 13:
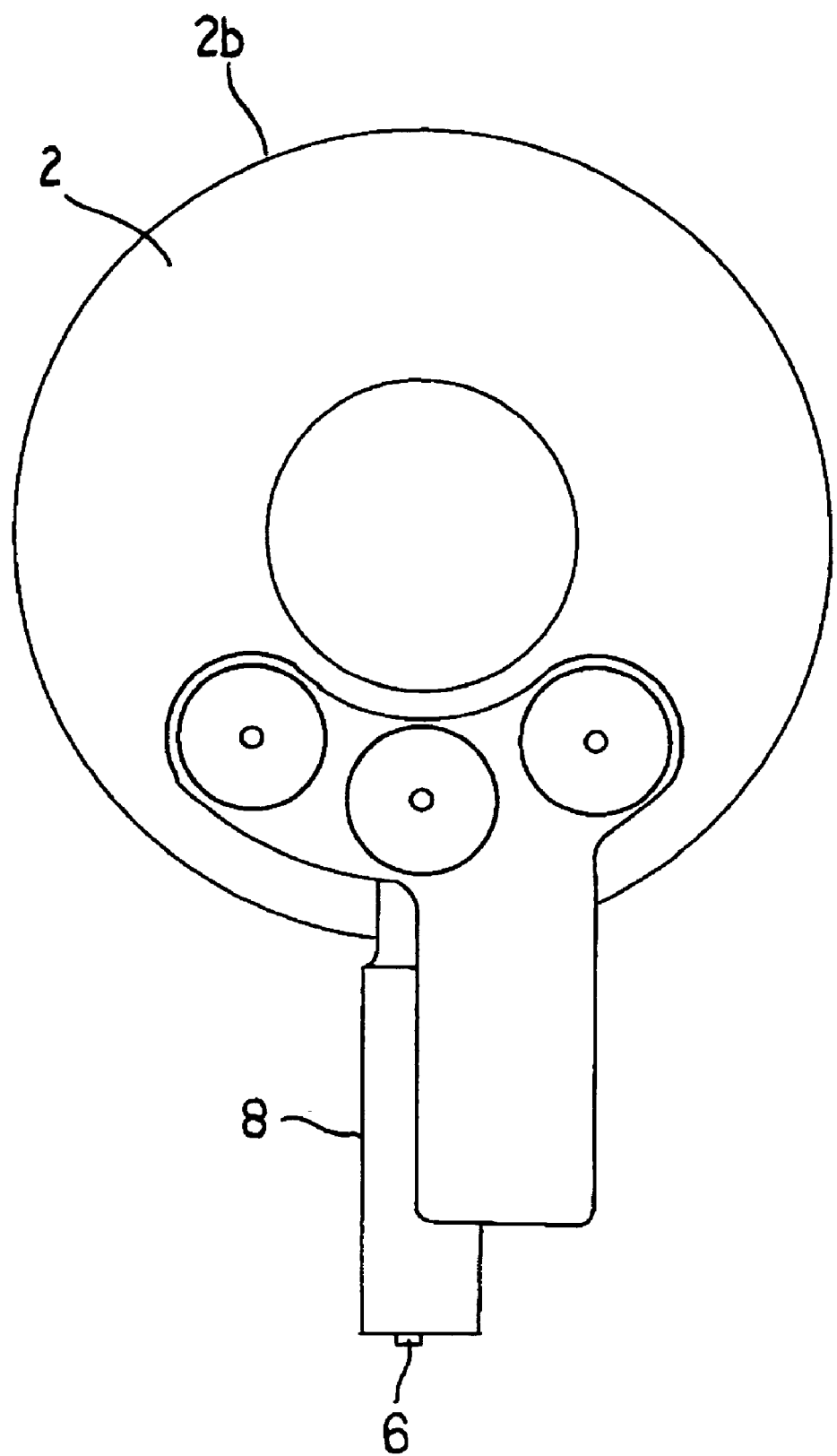
FIG. 13 is a rear view showing the electric rotating machine according to Embodiment 4 of the invention.

FIG. 12 is a side view showing an electric rotating machine according to Embodiment 4 of this invention, and FIG. 13 is a rear view taken in the direction A of FIG. 12.

Referring to the drawings, the output terminal board 8 is disposed on the side face 7a of the rear bracket 7 of the electric rotating mechanism 2. The three output harnesses 6 are led out in the direction perpendicular to the tangent of a circumferential line 2b forming the outer peripheral of the electronic rotating machine 2 and are arranged to extend substantially in parallel to one another.

This embodiment is advantageous especially in the case that there is any obstacle in the rear of the electric rotating machine 2, i.e., behind the rear bracket 7 side, and the output harnesses 6 are difficult to be disposed at the portion blocked by the obstacle. Furthermore, the output harnesses 6 can be disposed in such a direction as to be prevented from the thermal influence from the stator 16.

Embodiment 5.

Figure 14:
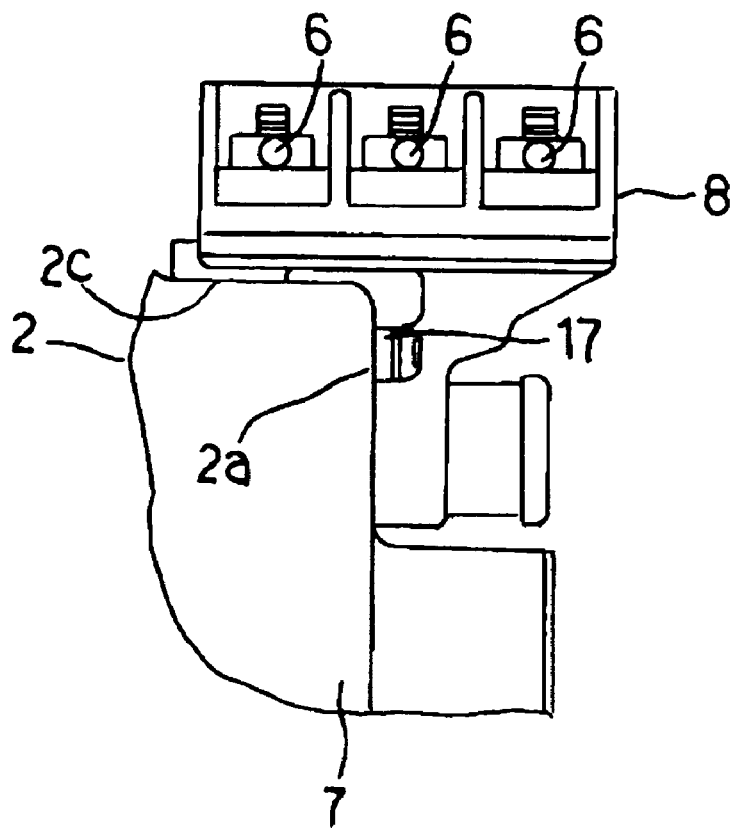
FIG. 14 is a side view showing apart of an electric rotating machine according to Embodiment 5 of the invention.

FIG. 14 is a side view showing a part of an electric rotating mechanism according to Embodiment 5 of this invention.

Referring to the drawing, the output terminal board 8 is disposed in contact with the rear bracket 7 at the outer circumferential face 2c and the rear end face 2a thereof, and is mounted by a screw 17.

Being fixed at least onto the mentioned two faces, the output terminal board 8 is easily positioned, whereby strength against vibration is improved.

Embodiment 6.

Figure 15:
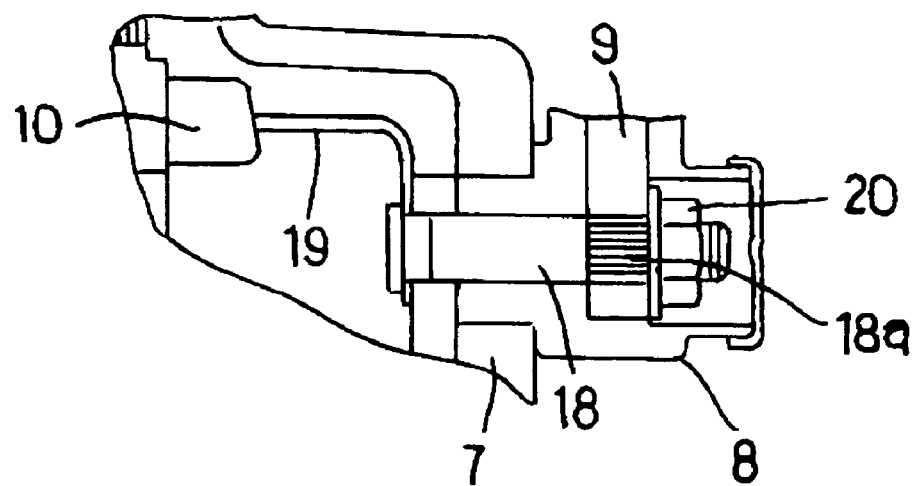
FIG. 15 is a side view showing a part of an electric rotating machine according to Embodiment 6 of the invention.

FIG. 15 is a side view showing a part of an electric rotating machine according to Embodiment 6 of this invention. Referring to the drawing, the output terminal 18 is connected with a three-phase output terminal line 19 of the stator coil 10 and extends from the rear bracket 7 serving as one bracket of the electric rotating machine 2.

A bolt capable of restraining electric loss to the minimum and performing sufficient strength is selected as the output terminal 18.

The output terminal board 8 is molded integrally with a terminal 9, and the terminal 9 is also formed into a configuration for performing sufficient strength.

The output terminal board 8 and the output terminal 18 are connected by press fitting with knurling or the like, and connected electrically and mechanically at the same time by connecting firmly with the use of a nut 20.

FIG. 15 shows an example that the terminal 9 and the output terminal 18 are press fitted with knurling at the portion 18a.

As described above, by fixedly connecting the three output terminals 18, extending from the rear bracket 7 and the terminal 9 in the output terminal board 8, the output terminal board 8 is firmly held on the rear bracket 7.

Since the three output terminals 18 extending from the rear bracket 7 and the terminal 9 in the output terminal board 8 are connected and fixed to one another, all of those members are firmly held on the rear bracket 7. As a result, this construction makes it possible to achieve not only electric connection but also mechanical holding of the output terminal board 8.

Embodiment 7.

Figure 16:
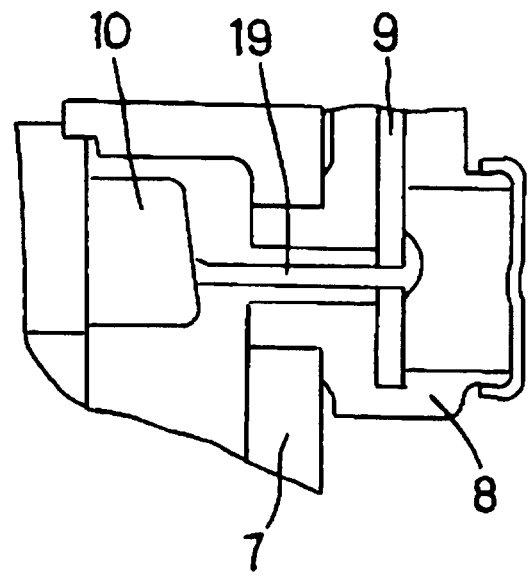
FIG. 16 is a side view showing a part of an electric rotating machine according to Embodiment 7 of the invention.

FIG. 16 is a side view showing a part of an electric rotating machine according to Embodiment 7 of this invention. In the drawing, three-phase output line 19 of the stator coil 10 of the electric rotating machine 2 is directly taken out of the rear bracket 7 and directly connected to the terminal 9 formed in the output terminal board 8 by insert molding.

As the three-phase output line 19 and a terminal 9 can be connected to each other by welding, brazing or the like, electric loss can be reduced as compared with joining with the use of bolt or screw.

Since the three three-phase output lines 19 extending from the rear bracket 7 are connected directly to the terminal 9 in the output terminal board 8, there is no heat generation due to connection with any other parts. Thus, heat generation is restrained as a whole.

Embodiment 8.

Figure 17:
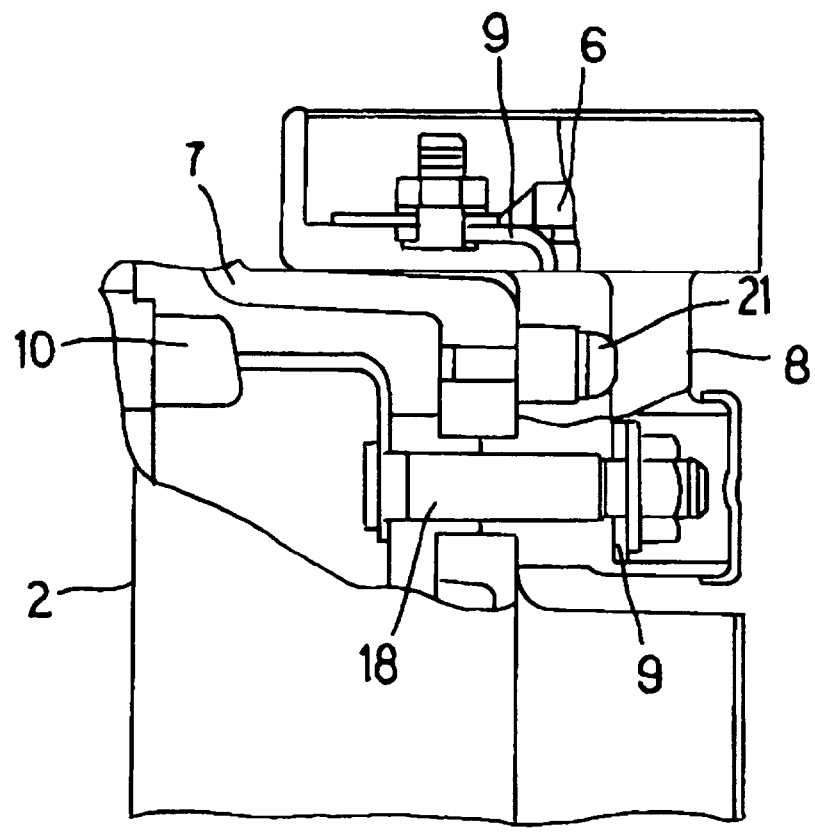
FIG. 17 is a side view showing a part of an electric rotating machine according to Embodiment 8 of the invention.

FIG. 17 is a side view showing a part of an electric rotating machine according to Embodiment 8 of this invention. In the drawing, a terminal 9 in the output terminal board 8 disposed on the rear bracket 7 of the electric rotating machine 2 is connected with the output terminal 18. Further, a screw 21 fixes and holds the output terminal board 8 on the rear bracket 7 to reinforce the fixation.

The output terminal 18 and the screw 21 for fixedly mounting the output terminal board 8 are directed to the same direction. As a result, it becomes easier to fix the output terminal board 8 onto the rear bracket 7, thus efficiency in mounting work being improved.

Embodiment 9.

Figure 18:
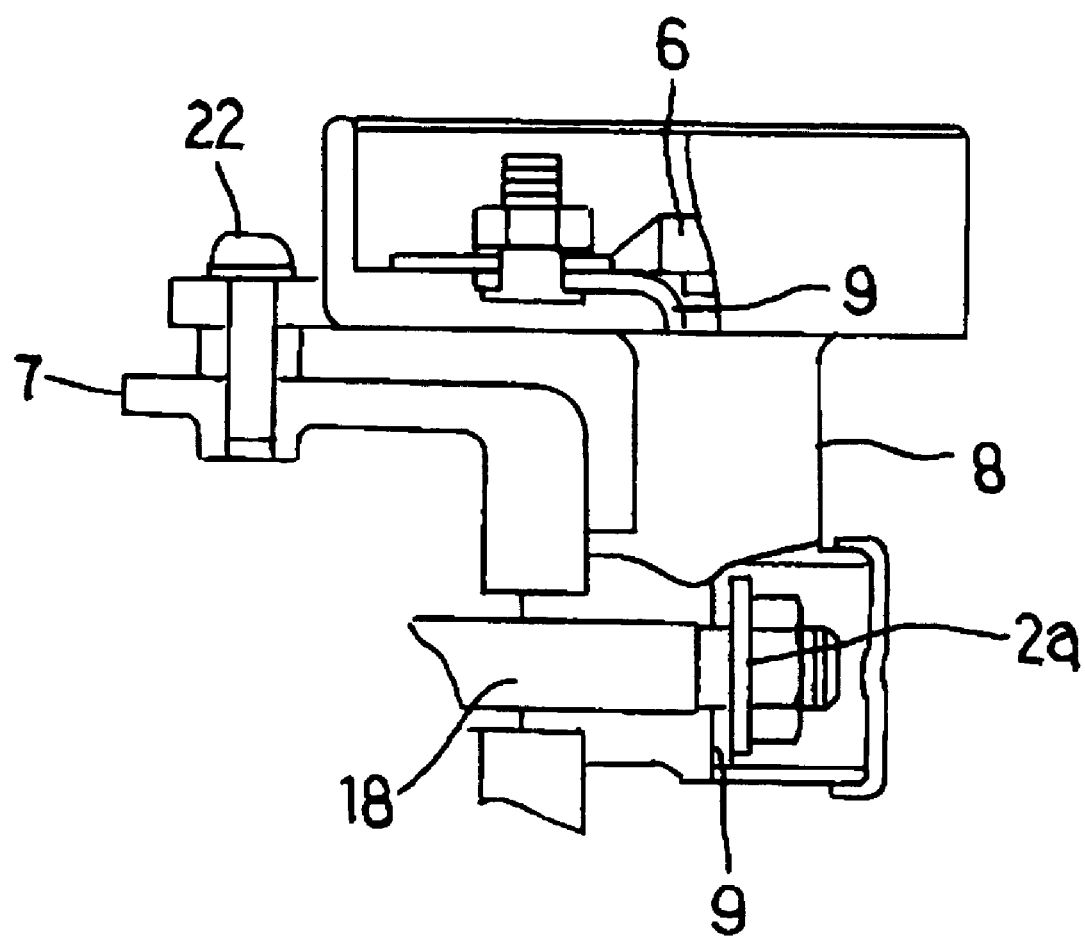
FIG. 18 is a side view showing a part of an electric rotating machine according to Embodiment 9 of the invention.

FIG. 18 is a side view showing a part of an electric rotating machine according to Embodiment 9 of this invention. In the drawing, a terminal 9 in the output terminal board 8 disposed on the rear bracket 7 of the electric rotating machine 2 is connected to the output terminal 18. A screw 22 fixes and holds the output terminal board 8 on the rear bracket 7 to reinforce the fixation thereof.

This output terminal board 8 is connected with the output terminal 18 at the rear end portion 2a of the rear bracket 7 from which the output terminal 18 extends. Further, at the side face of the rear bracket 7, which is substantially perpendicular to the rear end face 2a of the rear bracket 7 from which the output terminal 18 extends, the screw 22 fixes the output terminal board 8 onto the rear bracket 7.

Since being structured to connect mechanically in plural directions, the output terminal board 8 is firmly connected to the rear bracket 7.

Further, the output terminal 18 enables to connect electrically and to hold mechanically the output terminal board 8 at the same time. Furthermore, Clamping with the use of the screw 22 in vertical direction enables to fix the output terminal 8 more firmly.

Embodiment 10.

Figure 19:
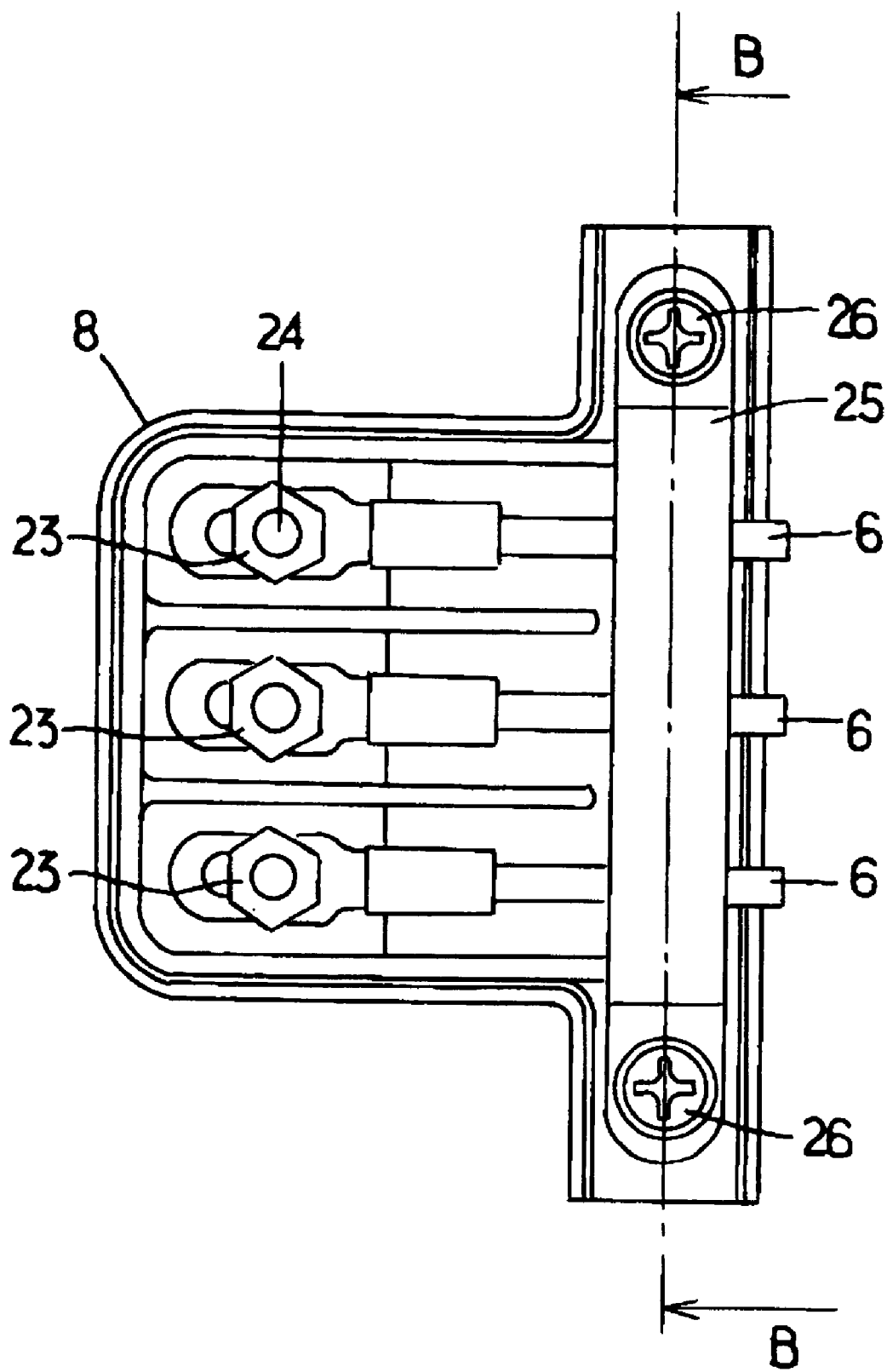
FIG. 19 is a plane view showing an output terminal part of an electric rotating machine according to Embodiment 10 of the invention.
Figure 20:
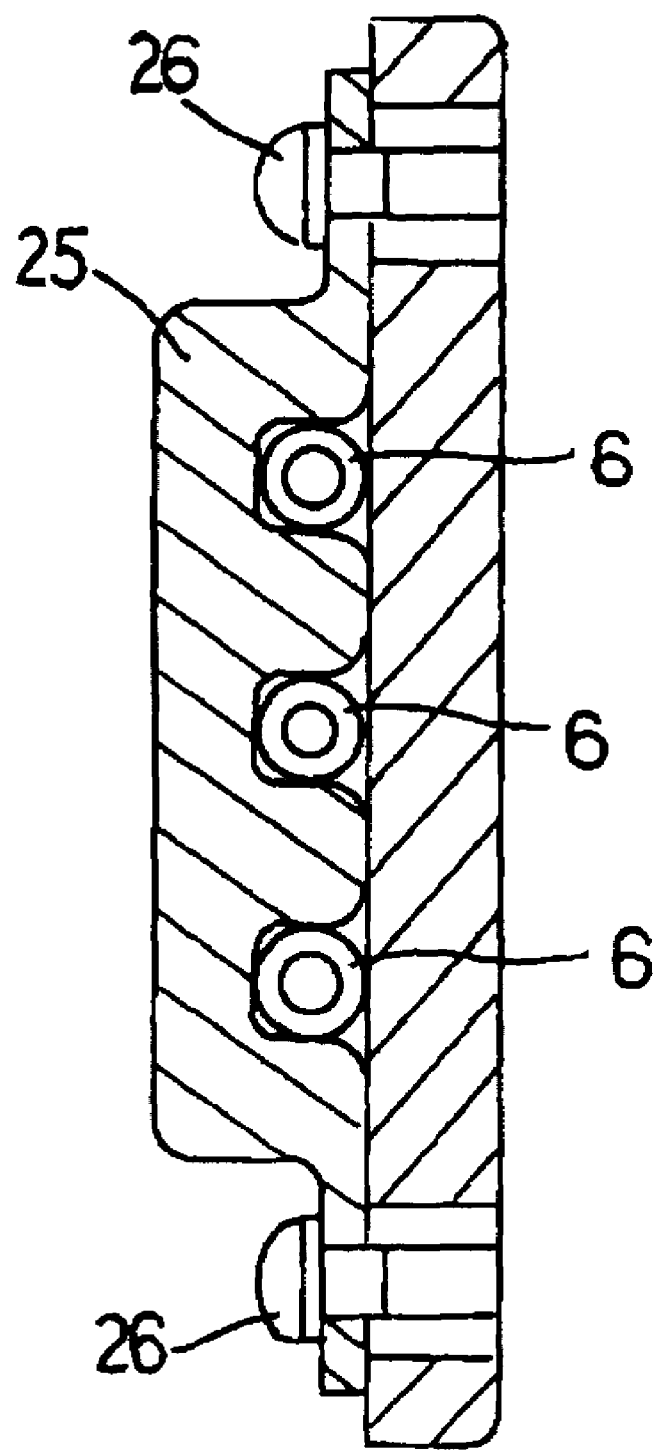
FIG. 20 is a sectional view taken along the line B—B of FIG. 19.

FIG. 19 is a plane view showing an output terminal board portion of an electric rotating machine according to the Embodiment 10 of this invention, and FIG. 20 is a sectional view taken along the line B-B of FIG. 31.

In the drawings, the output terminal board 8 is connected with the rear bracket 7 in the same manner as in the foregoing Embodiments 1 to 9. Nuts 23 connect the output harnesses 6 respectively.

A bolt 24 and nut 23 fixedly holds one end of each output harness 6. In order to hold the fixation stronger, it is shown that an output harness holding member 25 is applied to fix the output harnesses 6 onto the output terminal board 8.

In this embodiment, the output harness holding member 25 holds the output harnesses 6 from above and is fixed onto the output terminal board 8 with the use of fitting screws 26.

As described above, according to this embodiment, the output harnesses 6 are held by three output terminals of the output terminal board 8 and the harness holding member 25 provided on the end portion of the output terminal board 8. As a result, while connecting the three output terminals of the output terminal board 8 and the output harness 6, the output harnesses 6 are fixed onto the output terminal board 8 firmly by the harness holding member 25 at the end portion of the output terminal board 8.

Embodiment 11.

Figure 21:
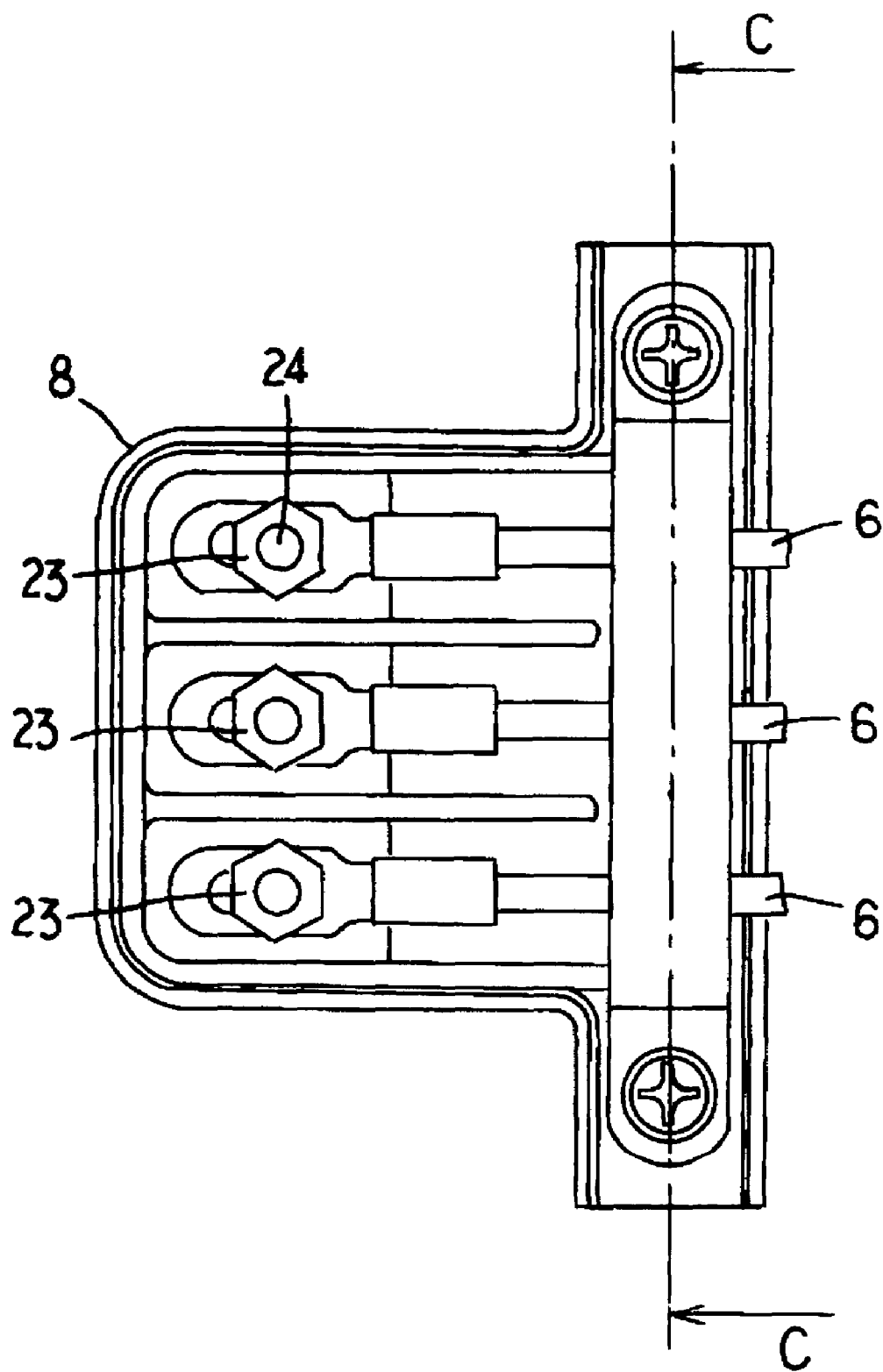
FIG. 21 is a plane view showing an output terminal part of an electric rotating machine according to Embodiment 11 of the invention.
Figure 22:
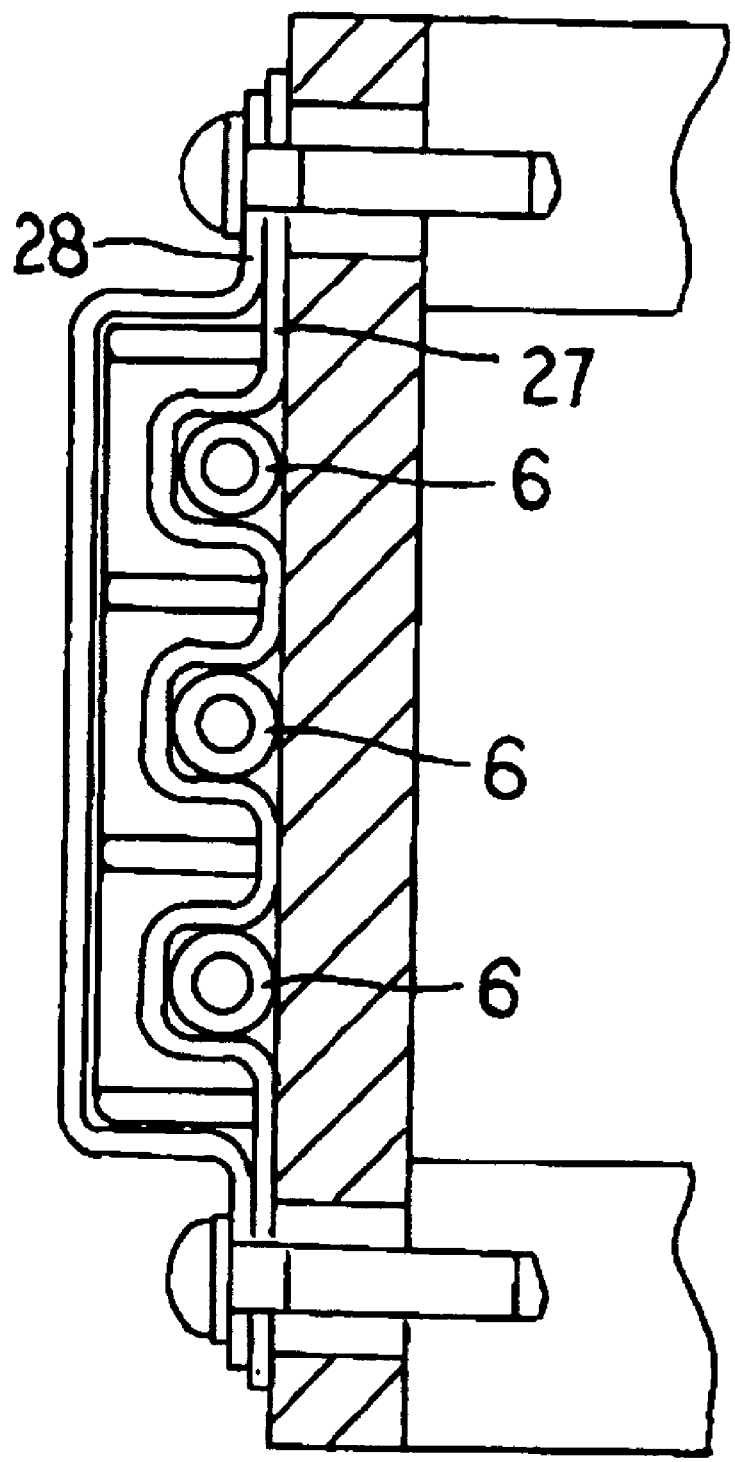
FIG. 22 is a sectional view taken along the line C—C of FIG. 21.

FIG. 21 is a plan view showing an output terminal board portion of an electric rotating machine according to Embodiment 11 of this invention and FIG. 22 is a sectional view taken along the line C-C of FIG. 21.

Referring to the drawings, in the same manner as in the foregoing embodiments 1 to 10, the output terminal board 8 is connected with the rear bracket 7 and the nuts 23 connect the output harnesses 6.

Each output harness 6 is composed of shield wire and therefore it is necessary for the shield wire portion to be grounded in order to reduce electromagnetic noises.

In this embodiment, it is featured that grounding the shield portion and holding the output harness 6 are achieved at the same time. Accordingly, the shield wire holding member 27 is composed of any conductive member or any resin member formed by insert molding of any conductive member, and is connected to the output terminal board 8.

In the shield wire holding member 27, the portion in contact with the output harnesses 6 is also composed of a conductive member and this portion is in contact with the shield portion of the output harnesses 6 to hold them.

In the output terminal board 8, at the portion joining to the shield wire holding member 27, a conductive member 28 is inserted by insert molding in view of grounding. This conductive member 28 is fixed for the grounding.

The portion composed of conductive member in the shield wire holding member 27 is fixed to be in contact with the conductive member 28 that grounds the output terminal board 8.

As described above, the output harness 6 is composed of shield wire and the shield portion of the output harness 6 is arranged to ground via the harness holding member. As a result, fixing the output harness 6 and grounding thereof can be achieved at the same time without fail.

What is claimed is:

1. An electric rotating machine comprising:
    a rotating element;
    a first bracket;
    a second bracket which faces in an outward direction along an axis of rotation of said rotating element; and
    an output terminal board mounted on an end surface of said first bracket of the electric rotating machine, said end surface facing along the axis of rotation in an outward direction opposite said second bracket, and
    output harnesses connected to said output terminal board;
    wherein said output harnesses are connected to said output terminal board in such a manner as to extend in a direction opposite to the outward direction which said second bracket faces, and
    wherein said first bracket is spaced apart from said second bracket in an axial direction of said rotating element.

2. An electric rotating machine according to claim 1 wherein said output terminal board is mounted on at least two faces of said rear bracket.

3. An electric rotating machine according to claim 1, wherein said output terminal board is fixed onto said bracket by connecting and fixing an output terminal to a terminal.

4. An electric rotating machine according to claim 1, wherein an output line from a stator coil and a terminal in said output terminal board are connected directly to each other.

5. An electric rotating machine according to claim 1, wherein said output terminal board is fixed onto said bracket by connecting and fixing said output terminal to said terminal, and said output terminal board is fixed onto said bracket with a screw in the same direction as mounting said output terminal.

6. An electric rotating machine according to claim 1, wherein said output terminal board is fixed onto said bracket by connecting and fixing said output terminal to said terminal, and said output terminal board is fixed onto said bracket with a screw perpendicularly to the direction mounting said output terminal.

7. An electric rotating machine according to claim 1 wherein one end of each output harness is fixed onto said output terminal board with a bolt or a nut and further with an output harness holding member.

8. An electric rotating machine according to claim 1 wherein one end of each output harness is fixed onto said output terminal board with a bolt or a nut and further with an output harness holding member, said output harness is composed of shield wire, and said output harness is grounded via said output harness holding member.

9. An electric rotating machine according to claim 1, wherein said output terminal board has a portion which extends along a side of said first bracket and another portion which extends along another side of said first bracket.

10. An electric rotating machine according to claim 9, wherein one of said portions extends in a direction parallel to the axis of rotation.

11. An electric rotating machine according to claim 1, wherein an output line from a stator coil and a terminal from said output terminal board are connected to each other.

12. An electric rotating machine according to claim 1, wherein said output terminal board is fixed onto said first bracket with a fastener, said fastener extends in the same direction as the output harnesses.

13. An electric rotating machine according to claim 1, wherein said output terminal board is connected to said first bracket by a terminal, and said terminal is fixed to said first bracket with a fastener which extends parallel to one portion of said terminal and perpendicular to another portion of said terminal.

14. An electric rotating machine according to claim 1, wherein an end of each of said output harnesses is fixed onto said output terminal board with a bolt or a nut, and said output harnesses respectively comprise a shield wire.

15. An electric rotating machine according to claim 1, wherein said output harnesses form a three-phase configuration.

16. An electric rotating machine according to claim 1, wherein said first bracket is positioned at an end of the electric rotating machine, said end being opposite to an end where said second bracket is positioned.

17. An electric rotating machine according to claim 1, wherein the electric rotating machine comprises a stator, and said first bracket is positioned at an end of the electric rotating machine which is opposite to an end where said stator is positioned.

18. An electric rotating machine according to claim 1, wherein the electric rotating machine comprises a stator, and said output terminal board is positioned so as to not be above said stator in a radial direction.

19. An electric rotating machine comprising:
a rotating element;
a first bracket;
a second bracket which faces in an outward direction along an axis of rotation of said rotating element; and
an output terminal board mounted on said first bracket of the electric rotating machine, and output harnesses connected to said output terminal board;
wherein said output harnesses are connected to said output terminal board in such a manner as to extend in a direction opposite to the outward direction which said second bracket faces, and
wherein said first bracket is spaced apart from said second bracket in an axial direction of said rotating element,
wherein said output terminal board has a portion which extends along a side of said first bracket and another portion which extends along another side of said first bracket.

20. An electric rotating machine according to claim 19, wherein one of said portions extends in a direction parallel to the axis of rotation.

* * * * *